United States Patent [19]

Bresson et al.

[11] 3,931,439
[45] Jan. 6, 1976

[54] MODIFIED ASPHALT HYDRAULIC SEALER

[75] Inventors: Clarence R. Bresson; Forrest D. Spaulding, both of Bartlesville, Okla.

[73] Assignee: Phillips Petroleum Company, Bartlesville, Okla.

[22] Filed: Aug. 14, 1974

[21] Appl. No.: 497,289

Related U.S. Application Data

[62] Division of Ser. No. 325,387, Jan. 22, 1973, Pat. No. 3,856,732.

[52] U.S. Cl. ............... 428/265; 427/398; 428/289; 428/290
[51] Int. Cl.² ....................................... B23B 27/00
[58] Field of Search ............ 260/28.5 AV, 28.5 AS, 28.5 B; 161/170; 117/168, 138.8 E; 428/265, 289, 290; 427/398

[56] References Cited

UNITED STATES PATENTS

| | | | |
|---|---|---|---|
| 2,834,742 | 5/1958 | Scott et al. | 260/28.5 B |
| 3,010,928 | 11/1961 | Odasz, Jr. et al. | 260/28.5 |
| 3,345,316 | 10/1967 | Nielsen | 260/28.5 AS |
| 3,853,682 | 12/1974 | Hurst | 260/28.5 |

FOREIGN PATENTS OR APPLICATIONS

| | | | |
|---|---|---|---|
| 740,027 | 8/1966 | Canada | 260/28.5 A |

Primary Examiner—Melvyn I. Marquis

[57] ABSTRACT

Cut-back asphalt, when modified by the addition of a small amount of a butadiene-styrene block copolymer, a hydrogenated butadiene-styrene copolymer, or mixtures thereof, or an ethylene-vinyl acetate copolymer, provides an effective hydraulic sealant when applied to a nonwoven fabric.

8 Claims, No Drawings
}

MODIFIED ASPHALT HYDRAULIC SEALER

This a divisional application of my copending application Ser. No. 325,387 filed Jan. 22, 1973 now U.S. Pat. No. 3,856,732.

Heretofore, difficulty has been experienced in providing an asphaltic material suitable as a sealant for hydraulic barrier systems. The asphalt and asphaltic materials employed for such purposes have had a tendency to crack and contract at low temperatures and to soften at high temperatures. Conventional asphalts are also subject to cold flow at ambient temperatures and can be extruded through the matrix fabric of hydraulic barrier systems under hydraulic pressure.

For many uses it is particularly desirable to employ an asphalt having as high a heat softening point as possible. However, very high softening point asphalt is inherently hard and brittle. To overcome this problem there has previously been practiced the blowing of air through asphalt which resulted in a product of improved tenacity, high softening point, improved resistance to cold flow and improved low temperature ductility. Unfortunately, however, while resistance to cold flow is improved over conventional asphalts, blown asphalts are still subject to cold flow.

It is known that the addition of rubber improves the properties of asphalts from both the rheological point of view and the aging point of view. Mixtures of asphalt and rubber are often difficult to spread by means of sprayers in current use; further, the heating at high temperatures for rendering the mixtures fluid partially depolymerizes the rubber which in turn modifies the properties of the asphaltic mixture, causing it to lose a part of its properties. Very high application temperatures may also be detrimental to synthetic fibers which may comprise the hydraulic barrier matrix.

In efforts to obviate these difficulties, aqueous emulsions of asphalt containing latex have been used, which emulsions are generally prepared by adding latex to emulsions of previously prepared asphalt. Asphaltic emulsions may be unsatisfactory in many aspects. Apart from the phenomenon of coagulation of the latex, they often exhibit only a mediocre adhesiveness. Moreover, they are often very sensitive to atmospheric conditions during the curing period.

Another problem often encountered has had to do with running or puddling of the asphaltic materials during the curing period.

It is thus an object of this invention to provide improved asphaltic sealant compositions. It is a further object to provide an improved hydraulic barrier system.

Further objects and advantages of this invention will become apparent to those skilled in the art from the following description and accompanying claims.

It has been found, according to this invention, that the addition of a small amount of a hydrogenated random butadiene-styrene copolymer, a butadiene-styrene block copolymer, or mixtures thereof, or an ethylene-vinyl acetate copolymer to a cut-back air-blown asphalt results in an asphaltic composition having improved flow and barrier characteristics. Further, it has been found that these copolymers, when incorporated with an air-blown asphalt, produced appreciable thickening of the asphalt. These compositions are thixotropic when cold, but thin on heating for spray application. Upon application of the heated mixture to a fabric matrix, the asphalt gels quickly and does not run during cure. Further, it has been found that the application of said asphaltic compositions to a nonwoven fabric matrix results in an improved hydraulic barrier system.

The asphalts useful in the practice of this invention are those known as air-blown cut-back asphalts. Blown asphalts normally do not have an affinity for, or capacity to absorb rubbers or rubbery copolymers and normally possess characteristics which are considerably different from those of cracked, straight-run or vacuum-reduced asphalts. The blowing operation by which such blown asphalts are produced involves heating an asphalt, usually as an asphalt flux, to a temperature of about 400°–450° F. and oxidizing the mass by blowing air therethrough. A catalyst, such as phosphorus pentoxide, can be used if desired.

The result of this oxidation is a change in the nature of the entire mass. The purpose of oxidation is normally that of producing a harder asphalt of higher softening point, usually on the order of 170° F. or higher. Other physical and chemical characteristics of the asphalt which are generally changed by this blowing operation include the development of greater resistance to flow and to weathering. However, it has also been found that the resultant blown asphalts are less compatible with various rubbers than are the unblown or unaltered asphalts.

The term "cut-back" refers to solution of the material in an appropriate solvent. Thus, air-blown cut-back asphalt as used in the present invention is an asphalt which has been oxidized by a method as hereinbefore described, then dissolved in an appropriate solvent. Representative solvents which can be utilized include kerosene, toluene, naphtha, benzene, and the like.

The additive which is used in the composition can be a hydrogenated random butadiene-styrene copolymer, a block butadiene-styrene copolymer, or mixtures thereof, or an ethylene-vinyl acetate copolymer. In a presently preferred embodiment the additives are employed in an amount in the range of 1 to 10 weight percent of the cut-back asphalt.

The hydrogenated random butadiene-styrene copolymers of the present invention have a molecular weight in the approximate range of 25,000 to 125,000, a now preferred range being from about 30,000 to about 75,000. The copolymer can be one containing from about 30 to about 44 parts by weight butadiene per 100 parts by weight of total monomers. The values for butadiene content of the polymers are actually those for the butadiene in the monomers charged; however, these values are very close to those for the butadiene content of the polymers. During hydrogenation, olefinic group hydrogenation is 95 weight percent or more and phenyl group hydrogenation is 5 weight percent or less.

The molecular weights given throughout this application were calculated from the amount of initiator used in preparing the polymers, with an allowance for the known scavenger level. These values, known as kinetic molecular weight values, are, within experimental error, the same as number average molecular weights (see *Journal of Polymer Science*, Part A, Vol. 3, page 191 (1965)).

The copolymers of the present invention can be prepared by any of the conventional techniques known in the art, such as those described in U.S. Pat. No. 2,975,160, R. P. Zelinski, issued Mar. 14, 1961. For example, a mixture of butadiene and styrene monomers can be polymerized using butyllithium as a catalyst and tetrahydrofuran as a randomizing agent. The hydrogenation can be carried out in any manner known in the art, such as by the process of U.S. Pat. No. 2,864,809, R. V. Jones et al, issued Dec. 16, 1968, or that of U.S. Pat. No. 3,113,986, D. S. Breslow et al, issued Dec. 10, 1963, or that of U.S. Pat. No. 3,205,278, S. J. Lapporte, issued Sept. 7, 1965. For example, the copolymer can be hydrogenated over a reduced nickel-kieselguhr catalyst or over a nickel octoate-triethylaluminum catalyst system. Hydrogenated butadiene-styrene copolymers of the present invention are polymers which have been sufficiently hydrogenated to remove substantially all of the olefinic unsaturation, leaving only the aromatic (i.e., phenyl group) unsaturation. A now preferred hydrogenation random butadiene-styrene copolymer has a butadiene/styrene ratio of 41/59, an approximate molecular weight of 75,000, and is hydrogenated to 5 percent or less unsaturation.

The block copolymer of the present invention is a copolymer of butadiene and styrene having several polybutadiene chains extending from a central link with a polystyrene block attached to the outward end of each polybutadiene segment.

The block copolymer of the present invention can be prepared by any of the conventional techniques known in the art, such as those described in U.S Pat. No. 3,251,905, R. P. Zelinski, issued May 17, 1966, or that of U.S. Pat. No. 3,281,383, R. P. Zelinski and H. L. Hsieh, issued Oct. 25, 1966. Typically, the block copolymer is prepared by polymerization of the butadiene blocks using a suitable alkyllithium initiator, followed by polymerization of the terminal styrene blocks.

The presently preferred block copolymer has a butadiene/styrene ratio of 70/30 with 29 percent of the styrene appearing in the terminal blocks as polystyrene. The copolymer has an approximate molecular weight of 300,000, a melt flow of about zero, density 0.94 and a Mooney MS-4 value of 70–90 at 280°F.

In one embodiment the additive is a mixture of the random and block copolymers described above. The weight ratio of random:block copolymers is in the range of 1:10 to 10:1. This additive mixture is employed in an amount ranging from 1 to 10 weight percent of the cut-back asphalt. In a preferred emodiment, the random:block ratio is 1:1 by weight.

The ethylene-vinyl acetate copolymer of the present invention is commercially available in a variety of formulations. Available formulations have vinyl acetate contents ranging from 17 to 42 percent based upon the total monomers. The presently preferred formulation has a vinyl acetate content of 32–34 weight percent, a melt index of 22–28 (grams per 10 minutes, ASTM D 1238, modified), inherent viscosity 0.78, and density 0.957.

The asphaltic compositions of this invention can be combined with a fabric matrix to form a hydraulic barrier system, to provide a liner for a pond or storage pit, or a covering for a surface, as on the ground or a roadway of concrete or asphalt, or as a covering for a roof, or the like, as for storage of liquids, or repair of a structure or roadway, or laminate system consisting of a polyolefin, e.g., a polypropylene fabric impregnated with an asphalt-like material, e.g., asphalt.

Any fabric capable of absorbing or supporting the sealant mixture to form a hydraulic barrier can be used. Knit, tufted or woven fabrics, preferably made from rot-resistant fibers, can be used. In one embodiment of this invention, it has been found that a nonwoven fabric, more particularly described below, made from polypropylene fibers, needled and heat sealed on at least one side and optionally needled with an additional cap layer of fibers, is particularly suited for hydraulic barriers because of its high asphalt absorption characteristics.

In the present method of manufacture of the preferred fabric, crimped cut-stable fibers of 3 to 6 denier (grams of polymer/9000 meters of fiber length) are carded to form a thin web which is laid several layers thick on a pattern of continuous warp threads to yield a loose bat approximately 1 to 3 inches thick. This is fed to a needle punch operation where barbed needles compress and interlock the web and the warp threads together. The bat receives approximately 450 needle punches/sq. in. and is reduced to an overall thickness of about one-eighth inch. The fabric is passed between a hot roll and a cold roll and a nipping operation to fuse surface fibers together on the warp thread side; and then optionally through another set of rolls to fuse the other side. The fabric is then wound for storage. When only one set of nip rolls is used the fabric is called "fused on one side" (FIS). When two sets of nip rolls are used, the fabric is called "double fused" (DF). Capcoated fabrics are prepared by needling an additional bat of fibers to the unfused side or to one side of a doubly fused fabric.

In a presently preferred embodiment of this invention the nonwoven fabric material is a nonwoven fabric of polypropylene fibers, pigmented with carbon black. It weighs about 4 to 6 ounces per square yard, has a tensile strength in the "warp" direction of 80–90 pounds and a tensile strength in the fill or woof direction of 90–100 pounds. Such nonwoven fabric, we have found, will hold up to about four times as much asphalt material as will burlap mats, cotton fibers, woven cloth, and nonwoven fabrics made from other materials. A more preferred embodiment utilizes a capcoated polypropylene nonwoven fabric.

The asphaltic composition can be applied to the fabric by impregnation, painting, spraying or any other manner in which such compositions are ordinarily applied. A now preferred method of application is spraying.

The basic installation of a hydraulic barrier involves unrolling the nonwoven fabric, fused side down, followed by another layer of fabric on top of the first, fused side up. The pieces are sewn together on one side, forming a continuous seam. The top layer of fabric is pulled out and reversed so that the fused side is down and the process repeated until the whole installation is covered with fabric. The fabric is then sealed by spray application of sealant from either pressure tanks or a distribution truck.

To illustrate the manner in which the invention may be carried out, the following examples are given. It is to be understood however, that the examples are for the purpose of illustration, and the invention is not to be regarded as limited to any of the specific conditions cited therein.

Hydrostatic testing was performed at a temperature of 100° F. and at a pressure equal to 35 ft. of water.

In the examples which follow, the asphalt sealed samples of nonwoven fabric were prepared as follows:

A one-foot-square sample of nonwoven fabric was cut out, weighed, stapled to a one-foot-square piece of ¼-inch hardware screen and reweighed. The samples were placed on an open frame at a 45° angle and spray-coated with asphalt. Unmodified asphalt was applied at 120°–150° F.; modified asphalt was applied at 150°–250° F. The coating was applied with a Binks Model 18 or 62 gun at 60 psig with atomizing air nozzles removed when spraying. The samples were cured by standing at a 45° angle on bench tops and reweighed before testing to establish asphalt content. Application rates of asphalt and asphalt blends to the nonwoven fabrics ranged from 2.1 to 2.3 lb/yd$^2$.

Hydrostatic testing was performed as follows:

The test apparatus consisted of an 8 inch well cap with three one-inch pipe openings in the bell. These pipe openings were used for circulation of water at a controlled temperature, for a pressure sensing Mercoid switch controlling operation of a sealed circulating pump and timer and for a thermocouple well. Other lines were used for filling and emptying the test chamber. An 8 ¾-inch diameter test sample (cut from the one-square-foot sample with tin snips) was mounted in the bell opening. The wire screen backing was supported by an 8 ¾-inch diameter by ⅛-inch-thick steel plate. This plate had openings cut in it such that there was basically a 6 ½-inch diameter opening with ¼-inch bars every one-half inch. This plate was used as a safety device to prevent blowout ruptures during tests. The entire assembly was held in place by a bolted open flange. The chamber was filled with water while allowing air to escape. Water was circulated through a copper tubing coil in a constant temperature bath and then through the test chamber. When the chamber and lines were filled with liquid, the test pressure was applied. The Mercoid control was adjusted to shut off the timer and circulating pump on a two psig pressure drop.

EXAMPLE I

Polymer/asphalt blends were prepared as shown in Table I. Solutions of each polymer were first prepared in a suitable solvent, then admixed, in amounts given, with 300 g. of an air-blown cut-back asphalt, having a penetration value of 40, a ring-and-ball softening point of 180° F., and a ductility of 5. The asphalt was a 60 weight percent solution of asphalt in 200°–400° F. boiling range naphtha.

Polymers A and B are not within the scope of the invention but are included herein for illustrative purposes.

Solution of the polymers in the solvents noted in Table I was normally effected at room temperature. The admixture of polymers C and D required slight heating to effect solution.

The polymer solutions were blended with the asphalt by hand stirring at room temperature.

TABLE I

| | Polymer/Asphalt Blends | | | |
|---|---|---|---|---|
| Blend | Polymer | Wt. % Solution | Amount Added to 300 g. Asphalt | Resultant Blend, Parts Polymer Per 100 Parts Cut-back Asphalt |
| 1 | A$^1$ | 15% in toluene | 90 g. | 4.5 |
| 2 | B$^2$ | 15% in toluene | 90 g. | 4.5 |
| 3 | C$^3$ | 15% in toluene | 90 g. | 4.5 |
| 4 | D$^4$ | 15% in 1:1 toluene/Stoddard solvent | 72 g. | 3.6 |
| 5 | E$^5$ | 25% in toluene | 60 g. | 5 |
| 6 | C+D | 25% in 2:1 toluene/Stoddard solvent | 60 g. | 2.5 ea |

TABLE I-continued

| | Polymer/Asphalt Blends | | | |
|---|---|---|---|---|
| Blend | Polymer | Wt. % Solution | Amount Added to 300 g. Asphalt | Resultant Blend, Parts Polymer Per 100 Parts Cut-back Asphalt |

$^1$Random copolymer, 75/25 butadiene/styrene, density 0.935, inherent viscosity 2.15.
$^2$Block copolymer, 75/25 butadiene/styrene, 18% block polystyrene, inherent viscosity 0.95, density 0.933.
$^3$Block copolymer, 70/30 butadiene/styrene, 29% block polystyrene, melt flow about zero, density 0.94, approximate molecular weight 300,000.
$^4$Random copolymer, 41/59 butadiene/styrene, hydrogenated to less than 5% unsaturation.
$^5$Ethylene-vinyl acetate copolymer, 23–34% vinyl acetate.

Polymer blends 1 and 2 were thin when cold, i.e., there was no appreciable thickening of the asphalt. Blends 3–6 gave gels.

EXAMPLE II

For control purposes, unmodified air-blown cut-back asphalt was applied to various nonwoven fabrics. For this test, samples were given two coats of asphalt. The second coat was applied after the first coat had cured 24 hours at ambient laboratory conditions (about 70° F.).

TABLE II

| Unmodified Asphalt Coated Fabric | |
|---|---|
| Nonwoven Fabric | Time to Failure |
| 5 oz/yd$^2$ polypropylene FIS | Immediate failure |
| 5 oz/yd$^2$ nylon capcoated | 2 minutes |
| 4.7 oz/yd$^2$ polypropylene capcoated | 2 minutes |

EXAMPLE III

To illustrate that not all copolymers provide effective sealant additives for asphalt, asphalt blends 1 and 2 were applied to 4.7 oz/yd$^2$ polypropylene capcoated nonwoven fabric and tested hydrostatically as hereinbefore described. The results were as follows:

| Asphalt Blend | Time to Failure |
|---|---|
| 1 | 3.1 hours |
| 2 | Immediate failure |

EXAMPLE IV

Sealant blends 3, 5 and 6 of Example I were applied to a 4.7 oz/yd$^2$ polypropylene capcoated nonwoven fabric, then tested hydrostatically. The results were as follows:

TABLE III

| Blend | Polymer | Parts Polymer Per 100 Parts Asphalt | Time to Failure (Hours) |
|---|---|---|---|
| 3 | C | 4.5 | 60+ |
| 5 | E | 5 | 120+ |
| 6 | C+D | 2.5 ea | 160+ |

+test ended without failure.

EXAMPLE V

In comparison to Example IV, blend 4 gave the following results, under the same test conditions, when applied to other nonwoven fabrics:

| Nonwoven Fabric | Time to Failure (Hours) |
|---|---|
| 5 oz/yd$^2$ polypropylene FIS | 30+ |
| 5 oz/yd$^2$ nylon capcoated | 25+ |

+test ended without failure

The experimental data clearly show that the polymer additives of this invention, when mixed with an air-blown cut-back asphalt, provide improved hydraulic sealants.

Unmodified air-blown cut-back asphalt is almost totally ineffective as a hydraulic sealant; asphalt blends with polymers which are not within the scope of this invention are relatively ineffective as hydraulic sealants; asphalt blends with polymers which are within the scope of this invention provide extremely effective hydraulic sealants.

Other modifications and alterations of this invention will become apparent to those skilled in the art from the foregoing discussion and examples and it should be understood that this invention is not to be unduly limited thereto.

What is claimed is:

1. An improved hydraulic barrier system capable of withstanding a hydrostatic pressure at least equal to 35 feet of water at a temperature of 100°F comprising at least one layer of a suitable fabric having applied thereto a sealant composition consisting essentially of an air-blown cut-back asphalt having incorporated therein from 1 to 10 weight percent of an additive selected from the group consisting of (a) a hydrogenated random butadiene-styrene copolymer containing from about 30 to about 44 parts by weight of butadiene per 100 parts by weight of total monomers with the remainder being styrene; (b) a butadiene-styrene block copolymer having the configuration S-B-S, containing about 70 weight percent butadiene and about 30 percent styrene; and (c) mixtures of (a) and (b) in a weight ratio of (a) to (b) in the range of 1:10 to 10:1.

2. The barrier system of claim 1 wherein the weight ratio of said mixture (c) is 1:1.

3. The barrier system of claim 1 wherein said fabric is a nonwoven fabric.

4. The barrier system of claim 3 wherein said fabric is formed of polypropylene fibers.

5. The barrier system of claim 1 wherein said fabric is a nonwoven fabric formed of polypropylene fiber fused on one side and capped with an additional layer of fibers selected from polypropylene and nylon and said sealant composition consists essentially of said asphalt and said copolymer mixture (c).

6. A reservoir comprising as a liner extending over its inner surfaces the barrier system of claim 1.

7. A method of sealing an essentially porous substrate which comprises forming an asphaltic gel composition consisting essentially of an air-blown cut-back asphalt and from 1 to 10 weight percent of a mixture of (a) a hydrogenated random butadiene-styrene copolymer containing from about 30 to about 44 parts by weight per 100 parts by weight of total monomers with the remainder being styrene and (b) a butadiene-styrene block copolymer having the configuration S-B-S, containing about 70 weight percent butadiene and about 30 weight percent styrene, wherein the weight ratio of said (a) to said (b) is in the range of 1:10 to 10:1; heating said gel to a temperature sufficient to render said gel substantially liquid; applying said heated liquid to said substrate; and allowing said asphaltic composition to cool upon contacting said substrate, thus forming a gel and thereby sealing said substrate.

8. The method of claim 7 wherein said substrate is a nonwoven fabric.

* * * * *